United States Patent
Yin et al.

(10) Patent No.: US 8,477,840 B2
(45) Date of Patent: Jul. 2, 2013

(54) METHOD AND APPARATUS FOR CONSTRAINED VARIABLE BIT RATE (VBR) VIDEO ENCODING

(75) Inventors: Peng Yin, West Windsor, NJ (US); Jill MacDonald Boyce, Manalapan, NJ (US)

(73) Assignee: Thomson Research Funding Corporation, Indianapolis, IN (US)

( * ) Notice: Subject to any disclaimer, the term of this patent is extended or adjusted under 35 U.S.C. 154(b) by 1447 days.

(21) Appl. No.: 11/992,622

(22) PCT Filed: Sep. 27, 2006

(86) PCT No.: PCT/US2006/039207
§ 371 (c)(1),
(2), (4) Date: Mar. 26, 2008

(87) PCT Pub. No.: WO2007/038807
PCT Pub. Date: Apr. 5, 2007

(65) Prior Publication Data
US 2010/0158134 A1    Jun. 24, 2010

Related U.S. Application Data

(60) Provisional application No. 60/721,768, filed on Sep. 29, 2005.

(51) Int. Cl.
*H04N 7/12* (2006.01)
*H04N 11/02* (2006.01)
*H04N 11/04* (2006.01)

(52) U.S. Cl.
USPC ............ 375/240.02; 375/240.11; 375/240.12; 375/240.16

(58) Field of Classification Search
USPC ............ 375/240.01, 240.02, 240.11, 240.12, 375/240.16, 240.24
See application file for complete search history.

(56) References Cited

U.S. PATENT DOCUMENTS

| 5,798,796 A | 8/1998 | Sugiyama |
| 6,118,498 A | 9/2000 | Reitmeier |

(Continued)

FOREIGN PATENT DOCUMENTS

| CN | 1355995 A | 6/2002 |
| CN | 1436423 A | 8/2003 |

(Continued)

OTHER PUBLICATIONS

Westerlink, P.H. et al.: Two-Pass MPEG-2 Variable Bit-Rate Encoding: IBM J. Res. Devlop., vol. 43, No. 4, Jul. 1999, pp. 471-488.

(Continued)

*Primary Examiner* — Kwang B Yao
*Assistant Examiner* — Adam Duda
(74) *Attorney, Agent, or Firm* — Robert D. Shedd; Guy H. Eriksen

(57) ABSTRACT

A method and apparatus are provided for encoding video signal data for transmission in a network. The method includes the step of encoding the video signal data at a variable bit rate using at least one of a prioritized structure or a scalable coding structure to obtain a bitstream having a base layer and an enhancement layer. The encoding step encodes the video signal data such that a base layer bitrate is constrained to be less than or equal to a first value over a first time interval, and all of the bitstream, including the base layer and the enhancement layer, is constrained to a bitrate less than or equal to a second value over a second time interval.

18 Claims, 3 Drawing Sheets

U.S. PATENT DOCUMENTS

| | | | |
|---|---|---|---|
| 6,477,202 B1 | 11/2002 | Takeuchi et al. | |
| 6,510,177 B1 | 1/2003 | De Bonet et al. | |
| 6,639,943 B1 | 10/2003 | Radha et al. | |
| 7,020,193 B2 | 3/2006 | Van Der Schaar | |
| 7,072,366 B2 | 7/2006 | Parkkinen et al. | |
| 7,418,007 B1 | 8/2008 | Liu et al. | |
| 7,430,222 B2 | 9/2008 | Green et al. | |
| 7,457,415 B2 | 11/2008 | Reitmeier et al. | |
| 2003/0043904 A1 | 3/2003 | Naito | |
| 2003/0081672 A1 | 5/2003 | Li | |
| 2003/0138043 A1 | 7/2003 | Hannuksela | |
| 2003/0169724 A1 | 9/2003 | Mehta et al. | |
| 2003/0196211 A1 | 10/2003 | Chan | |
| 2003/0206558 A1* | 11/2003 | Parkkinen et al. | 370/477 |
| 2004/0022316 A1 | 2/2004 | Ueda et al. | |
| 2004/0181813 A1 | 9/2004 | Ota et al. | |
| 2005/0053086 A1 | 3/2005 | Mehta et al. | |
| 2005/0117641 A1 | 6/2005 | Xu et al. | |
| 2005/0138668 A1 | 6/2005 | Gray et al. | |
| 2005/0175085 A1* | 8/2005 | Bergen et al. | 375/240.01 |
| 2005/0229221 A1 | 10/2005 | Kerofsky et al. | |
| 2006/0117360 A1 | 6/2006 | Cooper et al. | |

FOREIGN PATENT DOCUMENTS

| | | | |
|---|---|---|---|
| CN | 1461568 A | | 12/2003 |
| EP | 1173028 | | 1/2002 |
| EP | 1505837 | | 2/2005 |
| JP | 02-182081 | | 7/1990 |
| JP | 6-339115 | | 12/1994 |
| JP | 08-317384 A2 | | 11/1996 |
| JP | 11-112998 | | 4/1999 |
| JP | 2000-78529 | | 3/2000 |
| JP | 2001-025013 A2 | | 1/2001 |
| JP | 2002-100994 | | 4/2002 |
| WO | WO 00/41483 | * | 7/2000 |
| WO | WO0225951 | | 3/2002 |
| WO | 2004/075561 A1 | | 9/2004 |

OTHER PUBLICATIONS

Search Report dated Nov. 4, 2007.

Kurceren, R., et al., "Synchronization-Predictive Coding for Video Compression: The SP Frames Design for JVT/H.25L", Proceedings 2002 International Conference on Image Processing ICIP 2002, Sep. 22, 2002, pp. II-497-II-500.

* cited by examiner

METHOD AND APPARATUS FOR CONSTRAINED VARIABLE BIT RATE (VBR) VIDEO ENCODING

CROSS-REFERENCE TO RELATED APPLICATIONS

This application claims the benefit, under 35 U.S.C. §365 of International Application PCT/US2006/39207, filed Sep. 27, 2006, which was published in accordance with PCT Article 21(2) on Apr. 5, 2007 in English and which claims the benefit of United States provisional patent application No. 60/721,768, filed on Sep. 29, 2005.

GOVERNMENT RIGHTS

The U.S. Government has a paid-up license in this invention and the right in limited circumstances to require the patent owner to license others on reasonable terms as provided for by the terms of project ID contract No. 2003005676B awarded by the National Institute of Standards and Technology.

FIELD OF THE INVENTION

The present invention relates generally to video encoding and, more particularly, to a method and apparatus for constrained variable bit rate (VBR) video encoding.

BACKGROUND OF THE INVENTION

Rate control is used to regulate the bitrate of an encoded video stream. When rate control is applied in an encoder, a quantization parameter is adjusted to meet a target bitrate. Rate control can be roughly separated into the following two categories: constant bit rate (CBR); and variable bit rate (VBR). In a network application, although CBR can greatly simplify network operation, CBR is less efficient than VBR and significantly comprises video quality, especially at low bitrates for high motion content. VBR can be seen as the "natural" representation for video, given that each individual frame will have a different level of complexity and, thus, requires a different number of bits to be compressed with the same decoded quality.

VBR coding has been considered to provide better quality than CBR coding, but pure or unconstrained VBR is not used in practice. One reason is because typical transmission environments may not allow arbitrary variations in transmission rate. Thus, the encoder needs to produce a VBR bitstream which can meet certain constraints.

When VBR is used in practice, the general constraints applied to the bitrate allocation are the average bitrate of the entire sequence or the total bitrate for particular intervals of frames. However, when VBR transmission is used in a network that is video-aware with respect to a video prioritized structure and/or scalable structure, or in addition, which allows video-aware packet-level multiplexing or switching, new VBR constraints are needed to take advantage of such a network, so that the best possible quality can be achieved.

SUMMARY OF THE INVENTION

These and other drawbacks and disadvantages of the prior art are addressed by the present invention, which is directed to a method and apparatus for constrained variable bit rate (VBR) video encoding.

According to an aspect of the present invention, there is provided a method for encoding video signal data for transmission in a network. The method includes the step of encoding the video signal data at a variable bit rate using at least one of a prioritized structure or a scalable coding structure to obtain a bitstream having a base layer and an enhancement layer. The encoding step encodes the video signal data such that a base layer bitrate is constrained to be less than or equal to a first value over a first time interval, and all of the bitstream, including the base layer and the enhancement layer, is constrained to a bitrate less than or equal to a second value over a second time interval.

According to another aspect of the present invention, there is provided a video encoder for encoding video signal data for transmission in a network that supports at least one of video-aware multiplexing and video-aware switching. The video encoder includes an encoder for encoding the video signal data at a variable bit rate using at least one of a prioritized structure or a scalable coding structure to obtain a bitstream having a base layer and an enhancement layer. The encoder encodes the video signal data such that a base layer bitrate is constrained to be less than or equal to a first value over a first time interval, and all of the bitstream, including the base layer and the enhancement layer, is constrained to a bitrate less than or equal to a second value over a second time interval.

These and other aspects, features and advantages of the present invention will become apparent from the following detailed description of exemplary embodiments, which is to be read in connection with the accompanying drawings.

BRIEF DESCRIPTION OF THE DRAWINGS

The present invention may be better understood in accordance with the following exemplary figures, in which.

DETAILED DESCRIPTION

Figure 1:
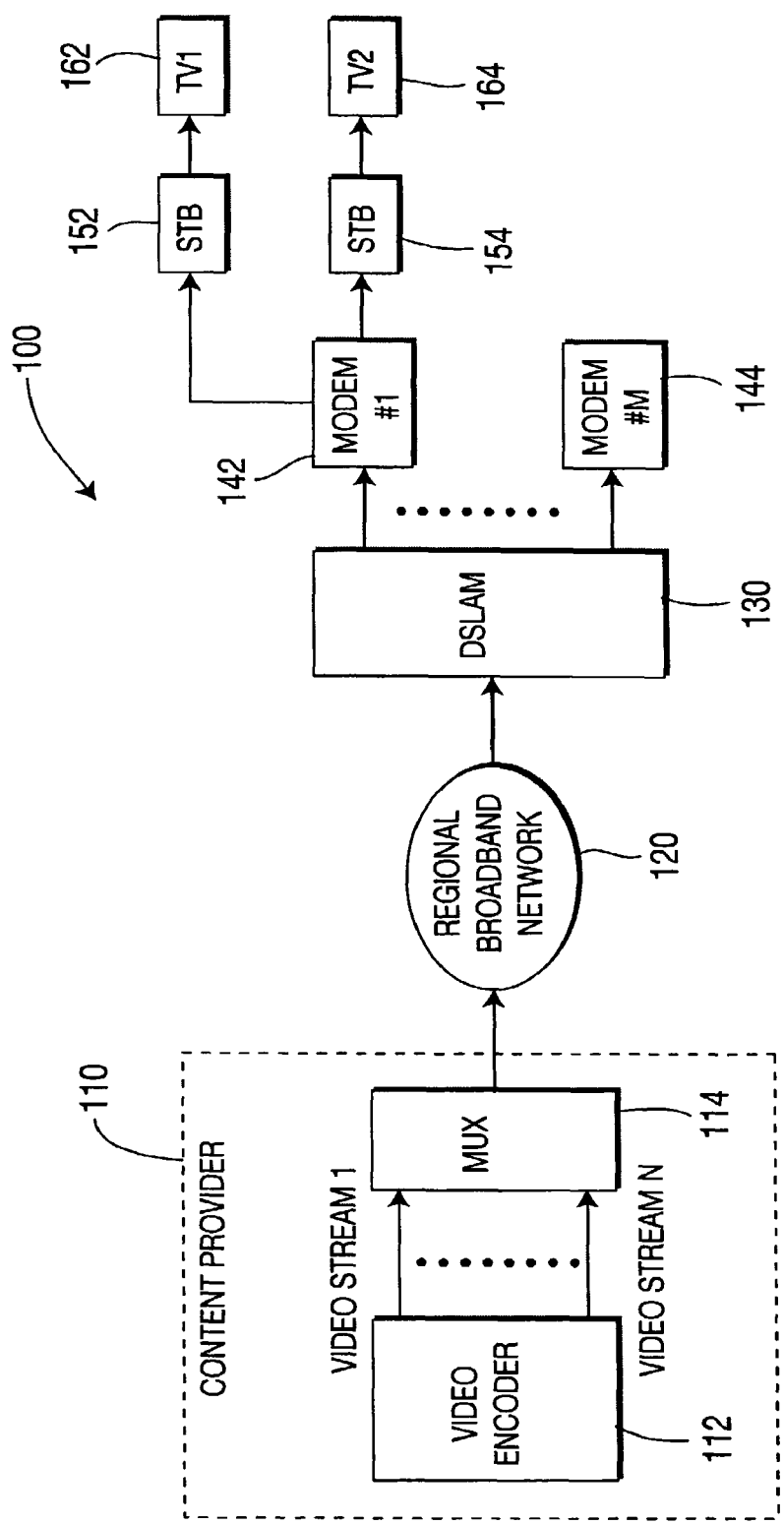
FIG. 1 is a block diagram for an exemplary video-aware network to which the present principles may be applied, according to an embodiment of the present principles.

The present invention is directed to a method and apparatus for constrained variable bit rate (VBR) video encoding. In an embodiment, new constraints for VBR are proposed that achieve improved quality for a network that is video-aware with respect to a prioritized coding structure and/or a scalable coding structure and that supports video-aware multiplexing or switching. As used herein, the term "video-aware" refers to a network, a router, and/or a switching mechanism which can differentiate video from other data or voice.

The present description illustrates the principles of the present invention. It will thus be appreciated that those skilled in the art will be able to devise various arrangements that, although not explicitly described or shown herein, embody the principles of the invention and are included within its spirit and scope.

All examples and conditional language recited herein are intended for pedagogical purposes to aid the reader in understanding the principles of the invention and the concepts contributed by the inventor to furthering the art, and are to be construed as being without limitation to such specifically recited examples and conditions.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the principles of the invention. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. It is thus regarded that any means that can provide those functionalities are equivalent to those shown herein.

Turning to FIG. 1, an exemplary video aware network is indicated generally by the reference numeral 100. The prioritized network 100 includes a content provider 110 which, in turn, includes a video encoder 112 and a multiplexer 114. First through N outputs of the video encoder 112, corresponding to video stream 1 through video stream N, are respectively connected in signal communication with first through N inputs of the multiplexer 114. An output of the multiplexer 114 is connected in signal communication with an input of a regional broadband network 120. An output of the regional broadband network 120 is connected in signal communication with an input of a Digital Subscriber Line Access Multiplexer (DSLAM) 130. First through M outputs of the DSLAM 130 are respectively connected in signal communication with an input of first through M modems (represented in FIG. 1 by modem 142 and modem 144). A first output of modem 142 is connected in signal communication with an input of an STB 152. An output of the STB 152 is connected in signal communication with an input of a television 162. A second output of modem 142 is connected in signal communication with an input of an STB 154. An output of the STB 154 is connected in signal communication with an input of a television 164.

The DSLAM 130 is configured to be video-aware. The DSLAM 130 will manage the traffic on each individual ADSL link to ensure that each household can receive any two (or any N) program streams with commercial-grade quality. For example, a house that includes set top boxes 152 and 154 and televisions 162 and 164 would be able to receive any two program streams from video encoder 112 via a single Asymmetric Digital Subscriber Line (ADSL) link through modem 142 with commercial-grade quality. The two bit streams over a single ADSL line should be able to dynamically utilize additional bandwidth if available on the ADSL link, e.g., if there is only one stream or if the other stream has lower instantaneous bitrate. A simple solution that would greatly simplify the multiplexing performed by the DSLAM 130 is to first divide the total bandwidth (R) of the network 100 by the number of bitsreams (N), which gives target average bitrate $R_{avg}=R/N$, then code each stream at CBR at the same bitrate $R_{avg}$. However, this will have lower quality than VBR.

Figure 2:
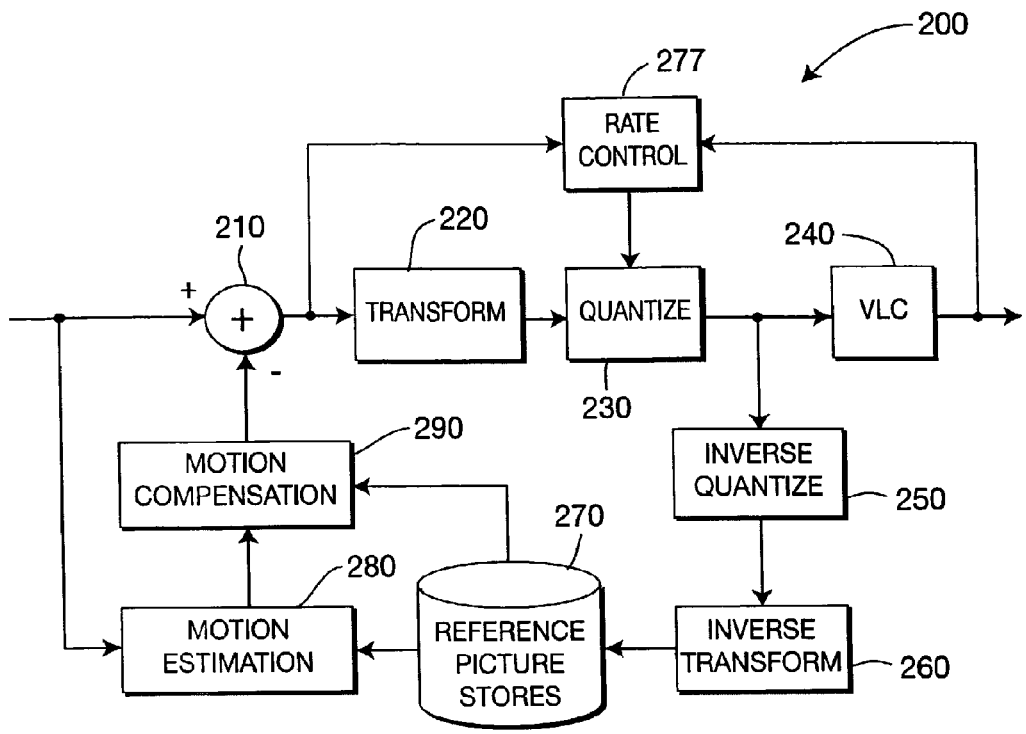
FIG. 2 is a block diagram for an exemplary video encoder to which the present principles may be applied, according to an embodiment of the present principles.

Turning to FIG. 2, an exemplary encoder to which the present invention may be applied is indicated generally by the reference numeral 200. An input to the encoder 200 is connected in signal communication with a non-inverting input of a summing junction 210. The output of the summing junction 210 is connected in signal communication with a block transformer 220. The transformer 220 is connected in signal communication with a first input of a quantizer 230. The output of the quantizer 230 is connected in signal communication with a variable length coder ("VLC") 240, where the output of the VLC 240 is an externally available output of the encoder 200. A first input of a rate controller 277 is connected in signal communication with the output of the summing junction 210, a second input of the rate controller 277 is connected in signal communication with the output of the VLC 240, and an output of the rate controller 277 is connected in signal communication with a second input of the quantizer 230.

The output of the quantizer 230 is further connected in signal communication with an inverse quantizer 250. The inverse quantizer 250 is connected in signal communication with an inverse block transformer 260, which, in turn, is connected in signal communication with a reference picture store 270. A first output of the reference picture store 270 is connected in signal communication with a first input of a motion estimator 280. The input to the encoder 200 is further connected in signal communication with a second input of the motion estimator 280. The output of the motion estimator 280 is connected in signal communication with a first input of a motion compensator 290. A second output of the reference picture store 270 is connected in signal communication with a second input of the motion compensator 290. The output of the motion compensator 290 is connected in signal communication with an inverting input of the summing junction 210.

In accordance with the principles of the present invention, a method and apparatus are disclosed in which new constraints for VBR are presented which achieve improved quality for a network that is video-aware with respect to a prioritized coding structure and/or a scalable coding structure and that supports video-aware multiplexing or switching (e.g., such as network 100 shown and described with respect to FIG. 1). It is presumed that the video stream supports prioritized and/or scalable video coding. For example, the stream could support temporal scalability using a prioritized structure that includes a base layer and an enhancement layer(s), as shown in FIG. 3.

Figure 3:
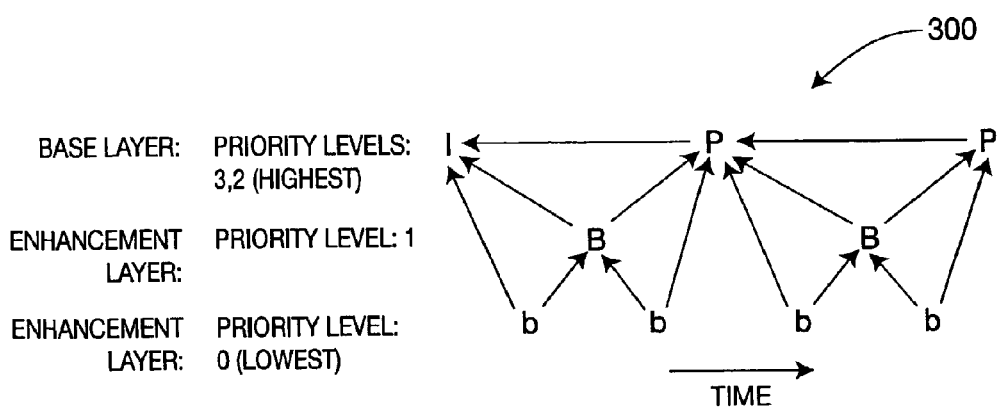
FIG. 3 is a diagram for an exemplary video group of pictures (GOP) structure to which the present principles may be applied, according to an embodiment of the present principles.

Turning to FIG. 3, an exemplary video group of pictures (GOP) structure is indicated generally by the reference numeral 300. The video GOP structure 300 is shown in display order and illustrates frame dependencies and assigned priority levels. The base layer 310 includes only I and P pictures and the enhancement layer 320 includes B/b pictures. I pictures are intra-coded pictures and are used as references when coding other pictures. P pictures are inter predictively-coded pictures and are used as reference when coding other pictures. B pictures are bi-predictively coded pictures and are used as reference when coding other pictures. b pictures are bi-predictively coded pictures that are not used as reference when coding other pictures. The base layer 310 has a higher priority than the enhancement layer 320. The base layer 310 can be decoded independently from the enhancement layer 320 for lower frame rate video. With this type of structure, we allow the variable bitrate produced by the encoder to exceed the target average bitrate (I+P+B+b), but a certain portion of the bit stream (B+b), e.g., the enhancement layer, can be discarded without affecting the following the base layer bitstream stream and while still meeting the commercial-grade quality requirement (I+P). In the case where VBR is used to generate this type of bit stream such that only the average bitrate of bit streams and the peak bitrate for certain intervals are considered and, further, that all of the B/b frames are dropped, then the remaining bitrate might still be higher than the available bandwidth. This may force the DSLAM 130 to drop the packets with the highest priority, thus greatly impairing the video quality.

Presume that the base layer bitstream rate for bitstream i is $R_{base,i}$, where $R_{base,i}$ satisfies the following constraint:

$$\sum_{i=1}^{N} R_{base,i} \leq R. \quad (1)$$

A simple solution which satisfies Equation (1) is to set $R_{base,i} = R_{avg}$. However, other solutions are also possible. Presume that the entire bitstream rate (i.e., for the base layer and the enhancement layer(s)) for bitstream i is $R_{tot,i}$, where $R_{tot,i} \geq R_{base,i}$, which can be decided based on the bitrate ratio requirement between the base layer and the enhancement layer and/or the acceptable subjective quality. Thus, we can define the new VBR constraints for each bitstream as follows: (1) constraint 1 (base layer) constraint, wherein the base layer bitrate is constrained to at most $R_{base,i}$ over a time interval $T_{base}$; (2) constraint 2 (entire bitstream constraint), wherein the entire bitstream (the base layer and the enhancement layer(s)) is constrained to at most $R_{tot,i}$ over a time interval $T_{total}$; and (3) constraint 3 (MinQP constraint), wherein the minimum Quantization Parameter (QP) for each picture and/or macroblock is set to MinQP.

Of the preceding constraints, constraint 1 is directed to guaranteeing that the minimum acceptable quality can be met for all the bitstreams transmitted over the network. Since $R_{base,i}$ satisfies Equation (1), the base layer bitstream is guaranteed for all bitstreams, i.e., no pictures from the base layer will be dropped by the DSLAM 130. Constraint 2 is directed to taking advantage of statistical multiplexing to achieve the best possible quality when additional bandwidth is available. In constraint 3, MinQP is defined such that smaller values would needlessly increase the bitrate without offering subjective quality improvement. Constraint 3 can allow bitstreams with simple content to use less bandwidth, thus leaving more bandwidth to other bitstreams, which can also improve the statistical multiplexing gain.

In the above constraints, $T_{base}$ may be equal to $T_{total}$, or they may differ. The time interval can be decided as every continuous interval or each discrete interval. It is to be appreciated that constraint 3 is optional and may or may not be implemented in certain embodiments in accordance with the present principles.

Figure 4:
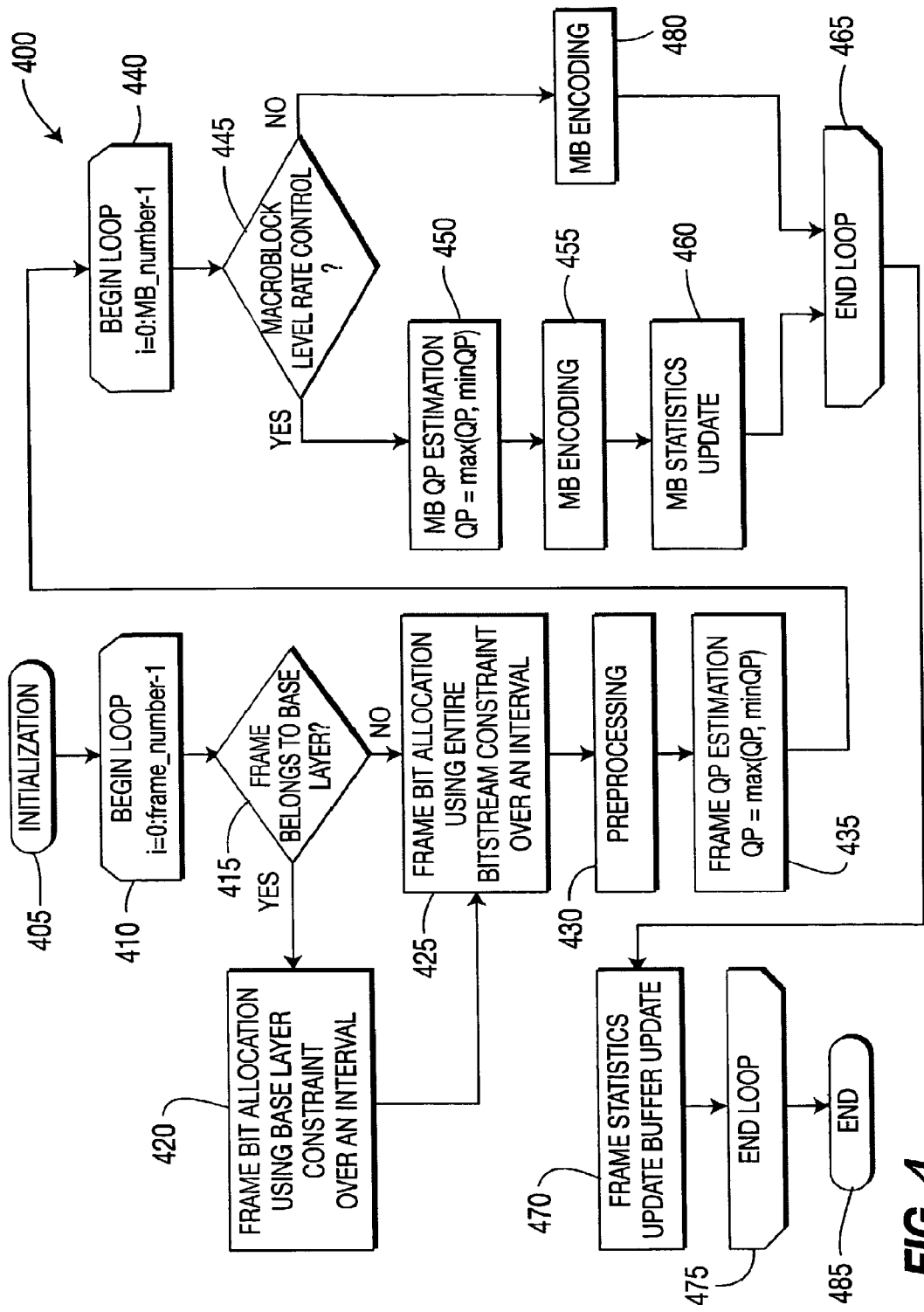
FIG. 4 is a flow diagram for an exemplary method for variable bit rate (VBR) encoding in a network that supports video-aware multiplexing and/or video-aware switching, according to an embodiment of the present principles.

Turning to FIG. 4, an exemplary method for variable bit rate (VBR) encoding in a network that supports video-aware multiplexing and/or video-aware switching is indicated generally by the reference numeral 400. The method 400 includes an initialization block 405 that passes control to a loop limit block 410. The loop limit block 410 begins a loop for each frame of a bitstream to be encoded, and passes control to a decision block 415. The decision block 415 determines whether or not the current frame belongs to the base layer. If so, then control is passed to a function block 420. Otherwise, control is passed to a function block 425.

The function block 420 performs frame bit allocation using the base layer constraint over an interval (constraint 1), and passes control to the function block 425. The function block 425 performs frame bit allocation using the entire bitstream constraint over an interval (constraint 2), and passes control to a function block 430. The function block 430 performs preprocessing of the current frame, and passes control to a function block 435. The function block 435 performs frame quantization parameter (QP) estimation, where QP=max(QP, minQP), and passes control to a loop limit block 440. The loop limit block 440 begins a loop for each macroblock in the current frame, and passes control to a decision block 445. The decision block 445 determines whether or not macroblock (MB) level rate control is to be performed. If so, then control is passed to a function block 450. Otherwise, control is passed to a function block 480.

The function block 450 performs macroblock quantization parameter estimation, wherein QP=max(QP,minQP), and passes control to a function block 455. The function block 455 performs MB encoding, and passes control to a function block 460. The function block 460 updates the macroblock statistics, and passes control to a loop limit block 465. The loop limit block 465 ends the loop for each macroblock of the current frame, and passes control to a function block 470. The function block 470 updates the frame statistics and frame buffer, and passes control to a loop limit block 475. The loop limit block 475 ends the loop for the current frame, and passes control to an end block 485.

The function block 480 performs macroblock encoding, and passes control to the loop limit block 465.

A description will now be given of some of the many attendant advantages/features of the present invention, some of which have been mentioned above. For example, one advantage/feature a method for encoding video signal data for transmission in a network, wherein the method includes encoding the video signal data at a variable bit rate using at least one of a prioritized structure or a scalable coding structure to obtain a bitstream having a base layer and an enhancement layer. The encoding step encodes the video signal data such that a base layer bitrate is constrained to be less than or equal to a first value over a first time interval, and all of the bitstream, including the base layer and the enhancement layer, is constrained to a bitrate less than or equal to a second value over a second time interval. Another advantage/feature is the method for encoding as described above, wherein the encoding step includes constraining a quantization parameter used for encoding a picture or a macroblock in the video signal data to be greater than or equal to a particular threshold. Moreover, another advantage/feature is the method for encoding as described above, wherein the video signal data is encoded into at least two bitstreams for transmission over the network, and the method further includes constraining a sum of base layer bitrates for the at least two bitstreams to be equal to or less than a total network bandwidth. Further, another advantage/feature is the method for encoding as described above, wherein the first value is set equal to a target average bitrate calculated by dividing a total network bandwidth by a total number of bitstreams to be transmitted over the network at a given time. Also, another advantage/feature is the method for encoding as described above, wherein the second value is set equal to or larger than the first value, based upon at least one of a bitrate ratio requirement of the base layer and the enhancement layer or an acceptable subjective quality. Additionally, another advantage/feature is the method for encoding as described above, wherein the first time interval and the second time interval are each capable of being selectively defined as a continuous time interval or a discrete time interval. Moreover, another advantage/feature is the method for encoding as described above, wherein the first time interval is equal to the second time interval. Further, another advantage/feature is the method for encoding as described above, wherein the first time interval is unequal to the second time interval. Also, another advantage/feature is the method for encoding as described above, wherein the network supports at least one of video-aware multiplexing and video-aware switching.

These and other features and advantages of the present invention may be readily ascertained by one of ordinary skill in the pertinent art based on the teachings herein. It is to be understood that the teachings of the present invention may be implemented in various forms of hardware, software, firmware, special purpose processors, or combinations thereof.

Most preferably, the teachings of the present invention are implemented as a combination of hardware and software. Moreover, the software may be implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

It is to be further understood that, because some of the constituent system components and methods depicted in the accompanying drawings are preferably implemented in software, the actual connections between the system components or the process function blocks may differ depending upon the manner in which the present invention is programmed. Given the teachings herein, one of ordinary skill in the pertinent art will be able to contemplate these and similar implementations or configurations of the present invention.

Although the illustrative embodiments have been described herein with reference to the accompanying drawings, it is to be understood that the present invention is not limited to those precise embodiments, and that various changes and modifications may be effected therein by one of ordinary skill in the pertinent art without departing from the scope or spirit of the present invention. All such changes and modifications are intended to be included within the scope of the present invention as set forth in the appended claims.

The invention claimed is:

1. A method for encoding video signal data for transmission in a network, the method comprising:
encoding, using an encoding device, the video signal data at a variable bit rate to obtain a bitstream having a base layer and an enhancement layer,
wherein said encoding step encodes the video signal data such that a base layer bitrate is constrained to be less than a first value over a first time interval, and combined base layer and enhancement layer bitrate is constrained to a bitrate less than a second value over a second time interval.

2. The method of claim 1, wherein said encoding step comprises constraining a quantization parameter used for encoding at least one of a picture or a macroblock in the video signal data to be greater than a threshold.

3. The method of claim 1, wherein the video signal data is encoded into at least two bitstreams for transmission over the network, and the method further comprises constraining a sum of base layer bitrates for the at least two bitstreams to be less than or equal to a total network bandwidth.

4. The method of claim 1, wherein the first value is set equal to a target average bitrate calculated by dividing a total network bandwidth by a total number of bitstreams to be transmitted over the network at a given time.

5. The method of claim 1, wherein the second value is set equal to or larger than the first value, based upon at least one of a bitrate ratio requirement of the base layer and the enhancement layer or an acceptable subjective quality.

6. The method of claim 1, wherein the first time interval and the second time interval are each capable of being selectively defined as a continuous time interval or a discrete time interval.

7. The method of claim 1, wherein the first time interval is equal to the second time interval.

8. The method of claim 1, wherein the first time interval is unequal to the second time interval.

9. The method of claim 1, wherein the network supports at least one of video-aware multiplexing and video-aware switching.

10. An apparatus for encoding video signal data for transmission in a network, the video encoder comprising:
an encoder for encoding the video signal data at a variable bit rate to obtain a bitstream having a base layer and an enhancement layer,
wherein said encoder encodes the video signal data such that a base layer bitrate is constrained to be less than a first value over a first time interval, and combined base layer and enhancement layer bitrate is constrained to a bitrate less than a second value over a second time interval.

11. The apparatus of claim 10, wherein said encoder constrains a quantization parameter used for encoding at least one of a picture or a macroblock in the video signal data to be greater than a threshold.

12. The apparatus of claim 10, wherein the video signal data is encoded to obtain at least two bitstreams for transmission over the network, and said encoder constrains a sum of base layer bitrates for the at least two bitstreams to be equal to or less than a total network bandwidth.

13. The apparatus of claim 10, wherein the first value is set equal to a target average bitrate calculated by dividing a total network bandwidth by a total number of bitstreams to be transmitted over the network at a given time.

14. The apparatus of claim 10, wherein the second value is set equal to or larger than the first value, based upon at least one of a bitrate ratio requirement of the base layer and the enhancement layer or an acceptable subjective quality.

15. The apparatus of claim 10, wherein the first time interval and the second time interval are each capable of being selectively defined as a continuous time interval or a discrete time interval.

16. The apparatus of claim 10, wherein the first time interval is equal to the second time interval.

17. The apparatus of claim 10, wherein the first time interval is unequal to the second time interval.

18. The apparatus of claim 10, wherein the network supports at least one of video-aware multiplexing and video-aware switching.

* * * * *